Oct. 19, 1965   H. A. BURLEY ETAL   3,213,280
METHOD AND APPARATUS FOR MEASURING HYDROGENOUS MATERIAL
Filed Aug. 24, 1960   4 Sheets-Sheet 1

INVENTORS
Harvey A. Burley,
Milton J. Diamond,
BY John P. Danforth, &
Arthur D. Block
Paul J. Reising
ATTORNEY Oct. 19, 1965    H. A. BURLEY ETAL    3,213,280
METHOD AND APPARATUS FOR MEASURING HYDROGENOUS MATERIAL
Filed Aug. 24, 1960    4 Sheets-Sheet 4
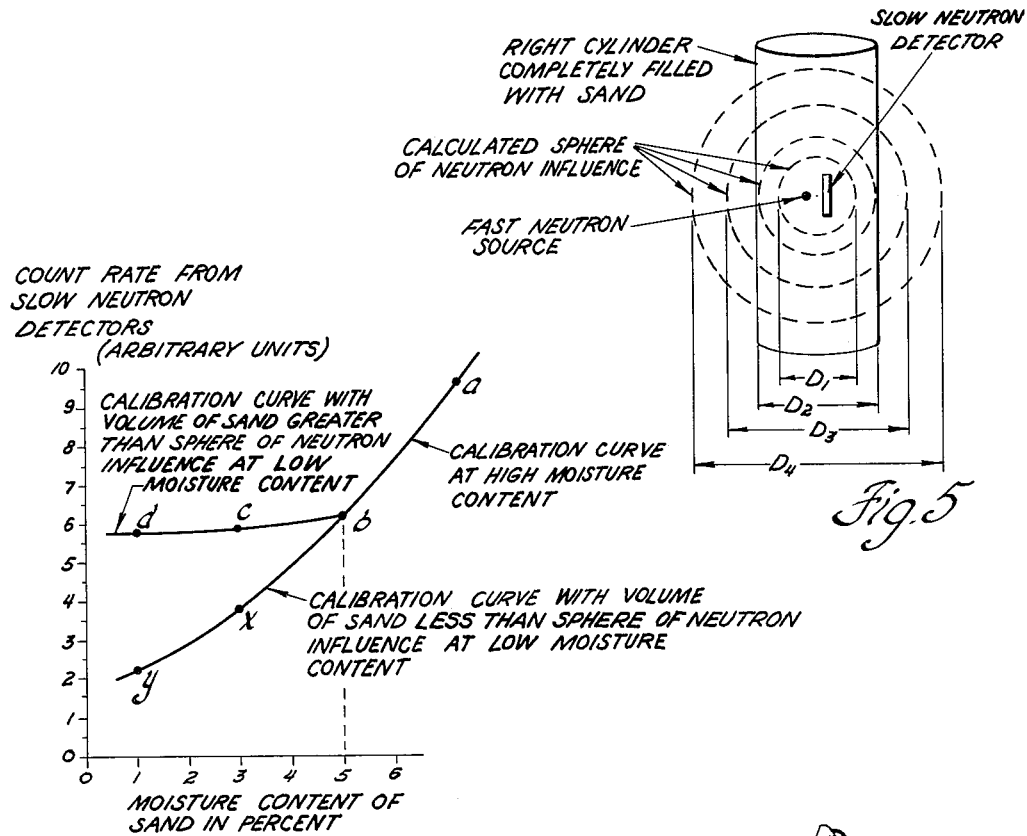
Fig. 5
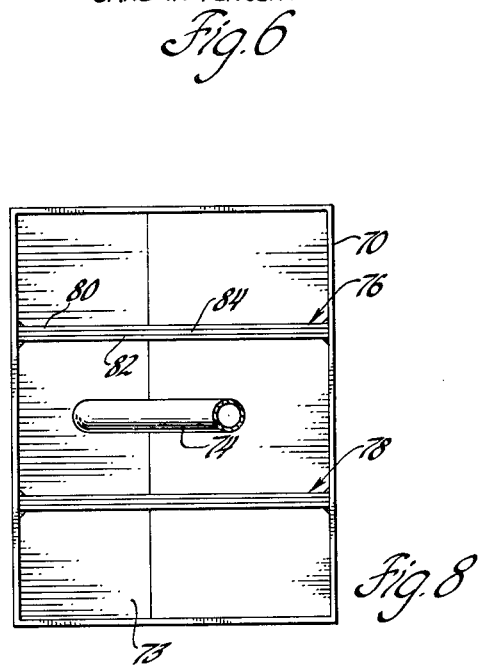
Fig. 6
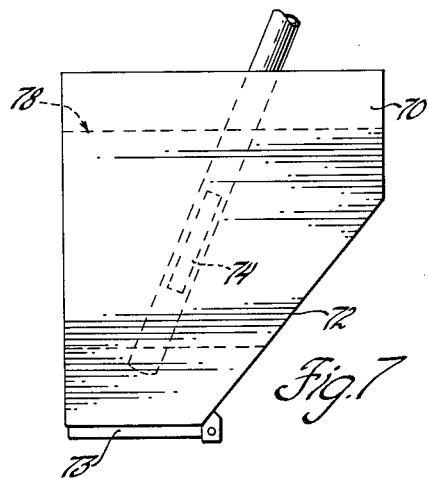
Fig. 7
Fig. 8
INVENTORS
Harvey A. Burley,
Milton J. Diamond,
BY John P. Danforth, &
Arthur D. Block
Paul G. Reising
ATTORNEY United States Patent Office 3,213,280
Patented Oct. 19, 1965

3,213,280
METHOD AND APPARATUS FOR MEASURING HYDROGENOUS MATERIAL
Harvey A. Burley, Warren, Milton J. Diamond, Saginaw, John P. Danforth, Mount Clemens, and Arthur D. Block, Birmingham, Mich., assignors to General Motors Corporation, Detroit, Mich., a corporation of Delaware
Filed Aug. 24, 1960, Ser. No. 51,738
20 Claims. (Cl. 250—83.1)

This invention relates to an improved method and apparatus for the determination and control of the amount of water or other hydrogenous material in a nonhydrogenous material such as sand. The process and apparatus have particular utility for the accurate measurement of relatively small percentages of hydrogenous material and, more specifically, for the determination and control of water moisture in foundry sand, and hence the invention will be described in detail specifically with reference thereto.

As is well known in the foundry art, it is quite important that control be maintained over the amount of moisture in the sand used for the molds and cores, particularly for the manufacture of castings of relatively complex shape such, for example, as crankshafts. Presently used moisture measuring methods such as hand-sampling, oven drying or electrical conductivity measurement are either slow, inaccurate, or limit the possible sand additives to nonconductors. In addition, all these methods measure too small a sample. In some foundries a 100-gram sample is oven dried each hour to serve as an indication of the moisture content of over 200 tons of sand. Such sampling techniques assume a uniformity of mixing and stability of control that in fact do not exist. With increasing complexity of casting design, there has been a growing need for a fast reliable moisture measuring method which can be successfully integrated into efficient sand-handling systems.

It is an object of the present invention to provide a fast and accurate method and apparatus for determining and controlling the amount of water or other hydrogen-containing compound in a nonhydrogenous material such as sand.

Another object of the invention is the provision of an improved method and apparatus which utilizes the thermalizing effect of hydrogen nuclei on fast neutrons as the means for accomplishing an accurate determination of the exact amount of hydrogenous material present in a composition containing only a small proportion of hydrogenous material.

Another object of the invention is the provision of measurement apparatus utilizing a fast neutron source and a thermal neutron detector to detect the amount of hydrogenous material present, and having an improved means for maintaining said apparatus continuously and accurately calibrated.

Still another object is to provide a method and apparatus for accurately measuring the amount of water in sand, such as foundry sand, wherein the moisture level is low, on the order of 5% or less.

If hydrogen nuclei are present in a field of fast neutrons, there is a probability that collisions will result and that the fast neutrons will lose some of their energy and thereby be reduced to thermal neutrons. (By the term "thermal neutrons" is meant neutrons having an energy not significantly in excess of approximately .025 electron volt and having an average velocity not significantly in excess of about $2.2 \times 10^5$ cm./sec. The term "fast neutrons" is applied to the group having an energy of about 0.1 million electron volt or greater. A 1 m.e.v. fast neutron has a velocity of about $1.4 \times 10^9$ cm./sec.) When fast neutrons collide with heavier elements they lose a much smaller fraction of their energy. Hence, the net result is that hydrogen is by far the most effective element for the thermalization of neutrons. The present invention utilizes this unique thermalizing effect of the hydrogen in water molecules to obtain a fast accurate determination of the amount of water in a mass of an otherwise substantially nonhydrogenous material such as sand, and with the most safety to the operating personnel. Briefly and with reference to foundry sand moisture measurement, the aforesaid objects are accomplished in accordance with the invention by inserting a thermal neutron detector positioned adjacent a fast neutron source into and adjacent the center of a sand mass of predetermined limited size, the count from the thermal neutron detector then being translated into a reading of the amount of moisture in the sand and preferably also into a reading of the amount of water which must be added in order to attain the desired moisture content. As indicated above and as will be hereinafter set forth in detail, the size of the sand mass on which the measurement is taken is important in obtaining accurate readings.

The above and other objects and features of the invention will appear more clearly from the following detailed description thereof which will be made with reference to the accompanying drawings in which:

FIGURES 5 and 6 are schematic and graphical representations of the relationship between various factors influencing accuracy of readings; and FIGURES 7 and 8 are top and side views, respectively, of the sand container portion of a preferred embodiment of the invention.

Figure 1:
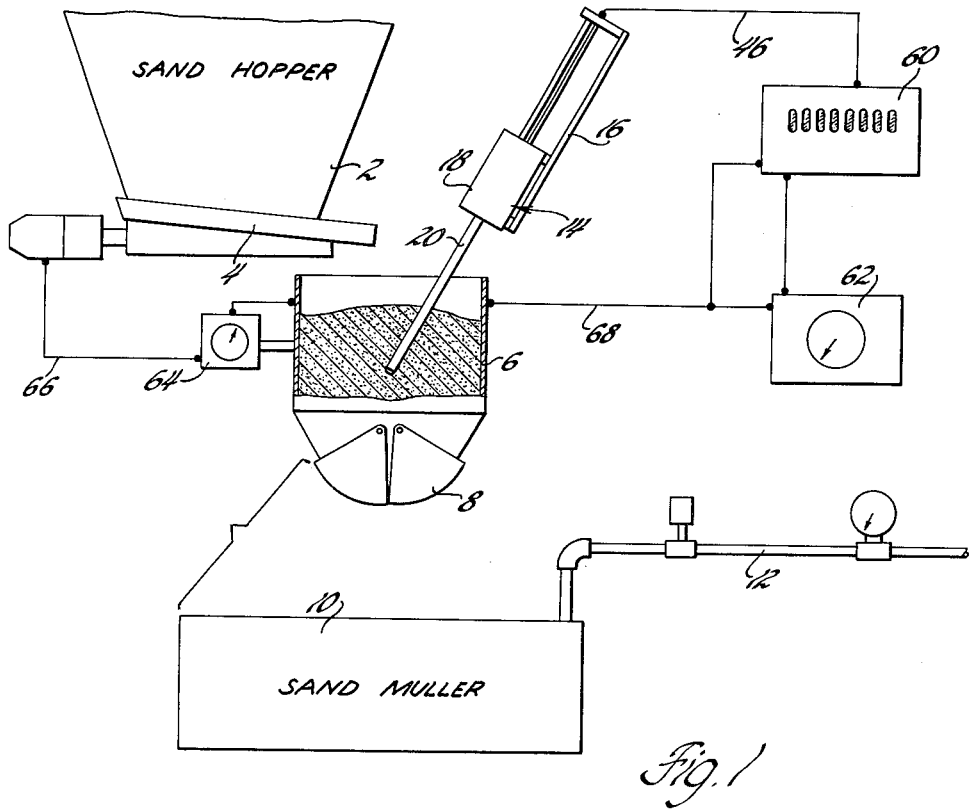
FIGURE 1 is a schematic view of the apparatus of the invention and is also illustrative of the process.

Referring now to FIGURE 1, there is shown at 2 a sand storage hopper having an electric vibrator 4 for feeding sand into a container 6 in which the moisture measurement is taken. The container has a pair of gates 8 at the bottom thereof which can be opened to dump the sand from the container into a sand muller 10 where an additional measured amount of water, to provide the desired moisture content, can be added by way of the water conduit 12 fitted with a suitable water meter. Prior to being placed in the storage hopper, the sand should be sufficiently dry that it does not contain more water than is ultimately desired. As will be hereinafter set forth in detail, the size of the container 6 is important in obtaining accurate measurements.

*The moisture gauge*

Figure 2:
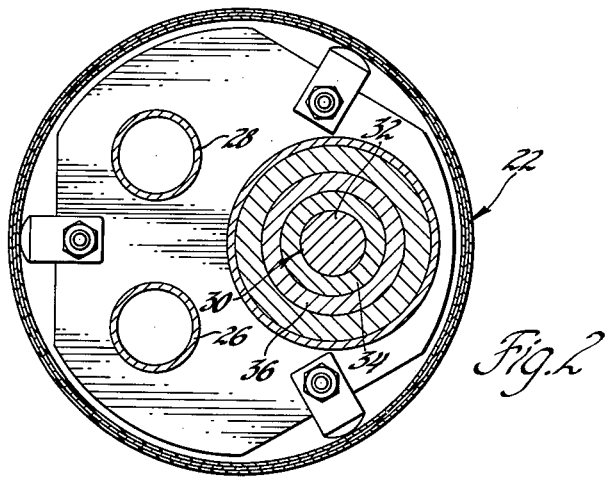
FIGURE 2 is a view taken on the line 2—2 of FIGURE 4.
Figure 3:
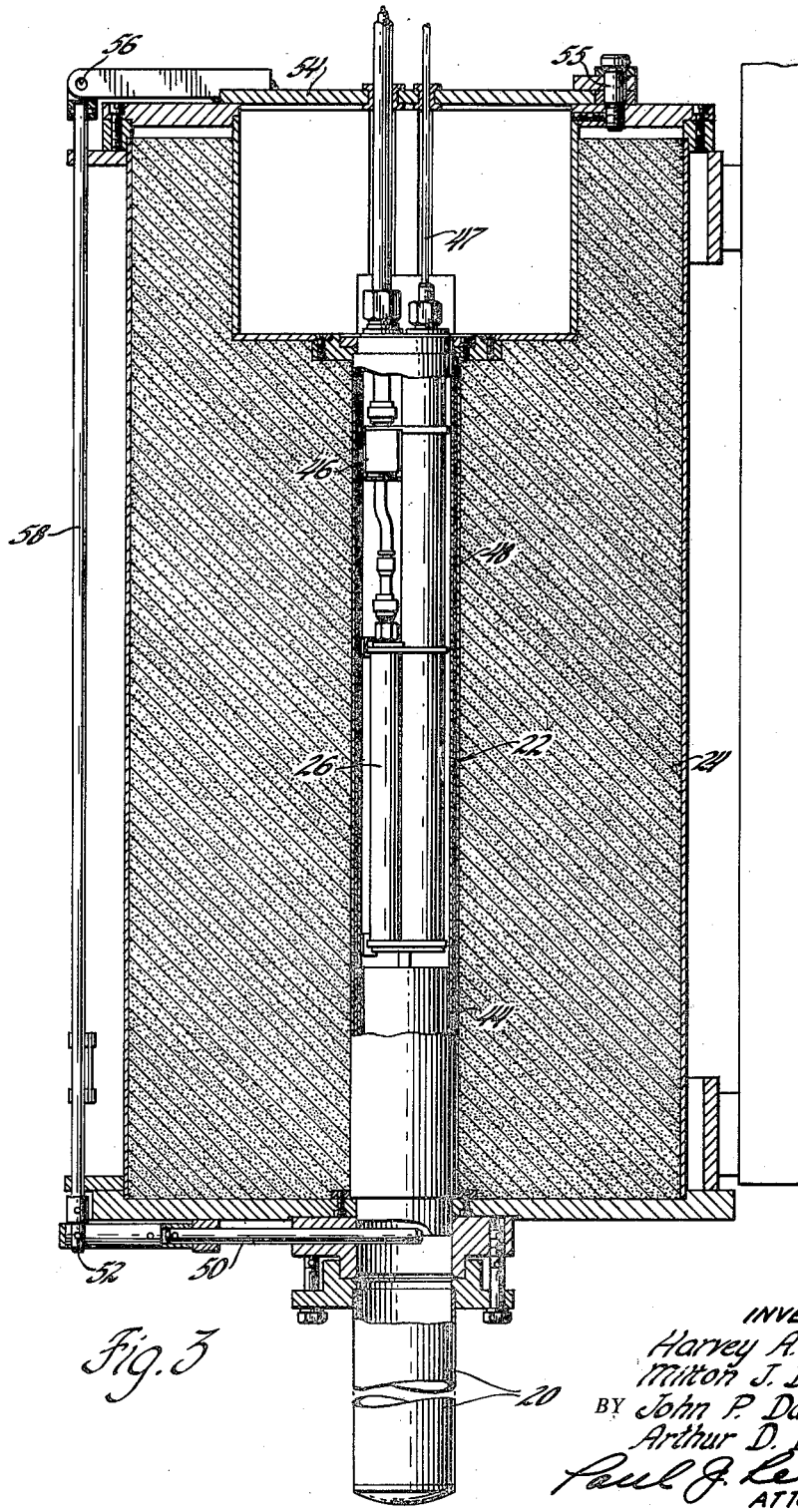
FIGURE 3 is a side view in section of the sand moisture gauge portion of the apparatus shown in FIGURE 1.
Figure 4:
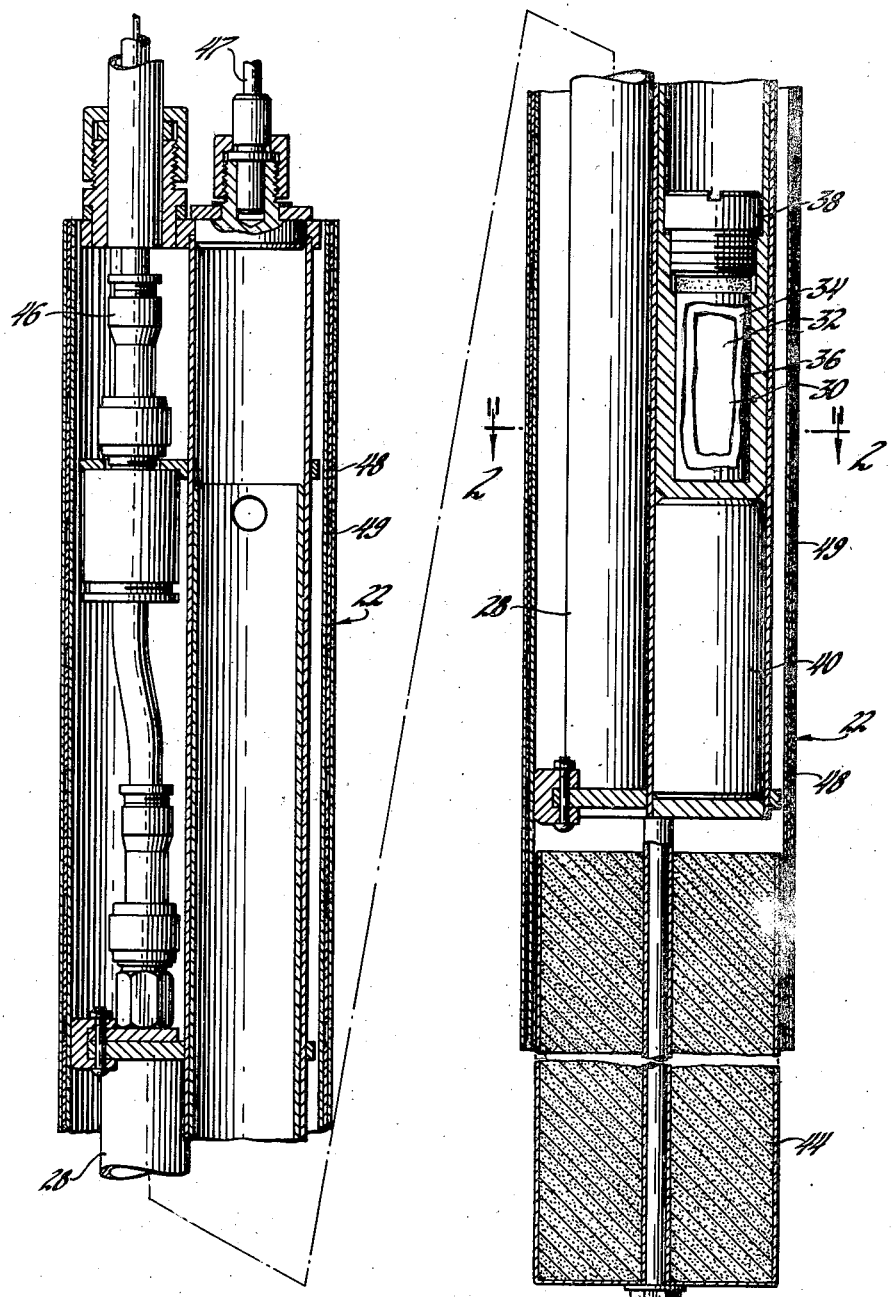
FIGURE 4 is a side view in section of a portion of the gauge shown in FIGURE 3, but in larger scale.

To determine the moisture content of the sand there is positioned above the container 6 a sand moisture gauge 14 with a support frame 16 and having a stainless steel casing with an upper relatively large cylindrical portion 18 and a lower cylindrical portion in the form of a relatively small diameter tube 20 which is closed at the lower end thereof and which extends to about the center of the container. Referring now to FIGURE 3 and also to FIGURES 2 and 4, a double walled stainless steel tube 22 which is aligned with and therefore forms an extension of the downwardly extending tube 20, extends through the casing portion 18, and the entire annular space in the casing portion 18 between the exterior walls thereof and the tube 22 is filled with paraffin 24. The paraffin filled casing portion 18 serves as a shielding drum for the neutron source, to be hereinafter described, when the source is not in use.

Mounted for reciprocable movement within the double walled tube 22 and tube 20 which forms an extension thereof, is an assembly having as its principal components a pair of thermal neutron detector tubes 26 and 28, arranged vertically side by side, and a fast neutron source 30 positioned adjacent and about the mid-point of the two detector tubes. The source 30, as to which details will be set forth hereinafter, consists of a fast neutron source material 32 incased in a tantalum jacket 34 which is in turn incased in a stainless steel jacket 36. The source is positioned in the bottom of the stainless steel holder 38, which is sealed with a screw cap and which can be conveniently withdrawn from the assembly from time to time for wipe testing to detect any leakage. The plug 40 below the source can be of stainless steel and merely serves as a spacer in order to position the source at about the mid-point of the detector tubes. Secured to the bottom of the detector tube-source assembly is a cadmium coated plug of paraffin 44 which serves to complete the shielding around the source when it is within the casing portion 18 and hence not in use. The cadmium coating on the paraffin plug 44 prevents the neutron thermalizing effect of the hydrogen in the paraffin from having any effect on the readings obtained when the detector tube-source assembly is within the sand taking a moisture measurement; cadmium is a good thermal neutron shield and hence blocks the passage of thermal neutrons out of the plug 44.

Electrical connections between the thermal neutron detector tubes and the scaler-timer mechanism to be described are shown at 46, and the cable for lowering and raising the detector tube-source assembly through the tube 20, to and from the center of the mass of sand, is shown at 47.

Safety locks

The device incorporates two safety locks. One of these consists of a rod 50 which, when inserted into tube 20 as shown, prevents movement of the detector tube-source assembly from its shielded position. A padlock can be inserted through the hole shown at 52 to maintain the rod in its safety position when the apparatus is not in use. The second safety lock is associated with the horizontally pivotable access door 54 pivotable on screw 55, at the top of the casing, a suitable padlock in the opening 56 preventing movement of the door except when the lock is removed by qualified personnel for wipe testing the source or otherwise checking the equipment. The long rod 58 merely interconnects the two safety features and makes it impossible to open the door 54 unless the rod 50 is in its inserted position as shown.

Mechanism to translate count to moisture reading

Where, as in foundry sand measurement, it is desirable that percentage moisture be determined with an error not exceeding 0.05%, it is essential that the over-all system accuracy be 1% or better, this 1% including not only the familiar statistical error but also errors due to relays, timers, circuit nonlinearities, meters, etc.

We have found that the combination providing such accuracy as well as the required reliability is a preset count type scaler, with a preset count in excess of 50,000, used in conjunction with a timer, i.e., a constant speed motor which drives a large dial pointer. With very moist sand the counts come at a high rate and the motor, starting from zero, turns the pointer through a small arc before the scaler collects the predetermined number of counts and stops the motor. With relatively dry sand the counts come more slowly and the motor, starting from zero again, turns the pointer through a larger arc before the sealer collects the predetermined number of counts and stops the motor. This arrangement makes it possible to calibrate the dial associated with the pointer directly in percent moisture. Our tests have shown that with a preset count of 100,000, such a system is within the 1% accuracy required.

Hence, referring again now to FIGURE 1, in the preferred embodiment, the thermal neutron detector tubes are connected by electrical cable 46 to a preset count type scaler 60 which is in turn connected to a timer 62 such that after the predetermined count the timer is automatically stopped. The container 6 is arranged to serve as a weighing scale 64 and when a predetermined amount of sand has been added to the container the feeding mechanism is stopped automatically by a suitable switching mechanism and electrical connection 66 to the electric feeder. Also, the scale is connected as shown at 68 to reset to zero and to actuate the scaler and the timer when the scale 64 registers the correct reading for the predetermined mass of sand, thereby triggering the operation of the scaler-timer mechanism.

Hence, the timer 62 is initially actuated by way of electrical connection from the scale 64 and stops upon signal from the scaler 60 when the preset count has been reached. As indicated above, the dial of the timer, instead of reading in time units, is provided with a scale which indicates percentage of moisture. It is desirable to provide the dial with a second scale which reads in terms of the volume of water required to be added to the mass of sand in order to raise the moisture level to the desired percentage.

Neutron source and neutron detectors

For efficiency in a fast moving production operation, it is highly desirable that moisture measurement be accomplished in a short amount of time, preferably within a minute. To obtain 100,000 counts in less than one minute with the system shown requires a source whose emission is between $2 \times 10^6$ and $3 \times 10^6$ neutrons per second. In this connection we have found that polonium-beryllium sources and plutonium-beryllium sources serve eminently well in the system, a plutonium-beryllium source being preferred.

The following are the specifications of the source used in the system shown in the drawings:

Material: 2 curies Pu-Be. Contains 32 grams of plutonium.

Neutron emission: $2.8 \times 10^6$ neutrons per second.

Neutron energy: Maximum—10.6 mev. Average—3–5 mev. (estimated).

Gamma emission: Slightly less than 0.7 gamma per neutron.

Gamma energy: 4.45 mev.

The preferred detector for the system is the boron trifluoride proportional counter. In the system shown in the drawings two Westinghouse WL–6307 $BF_3$ tubes are used in parallel; the use of two tubes doubles the sensitivity.

Size of sand mass for taking moisture measurement

With reference to container 6, we have found that to obtain optimum results, the quantity of sand used in taking the measurement is important. More specifically, we have found that the selection of the proper size for the container 6 should be based on the estimated moisture level of the sand, particularly where the moisture level is below about 5%.

Let us examine closely this effect that the moisture content has on the selection of container size. If a source of fast neutrons and a detector of slow neutrons are placed in the center of a small sphere of sand, a certain slow neutron count rate will result. If more sand is added in increments, still maintaining the spherical shape and the same moisture content, and if a slow neutron count rate is measured after the addition of each increment, it will be found that after the sphere has attained a certain size the addition of further sand will no longer increase the slow neutron count rate. This experiment demonstrates that there exists what can be termed as a "sphere of neutron influence" which can be defined as a sphere having its center at the probe or, more specifically, at the slow neutron detector and having a radius equal to the maximum distance from which neutrons thermalized by the hydrogen within the sand mass affect the thermal neutron flux at the detector. Hence, any water present within the sphere of neutron influence affects the thermal neutron count rate obtained, whereas water outside the sphere does not affect the count rate.

The size of this sphere varies inversely with the moisture content and has been found to follow approximately the expression Radius of sphere of neutron influence =
$$6 \sqrt[3]{\frac{100}{\text{percent moisture by weight}}}$$

It can be seen that if economy of neutrons were the only consideration, this formula would define the minimum size for container 6. Maximum container size would be determined chiefly on the basis that the mass should not be too much in excess of the sphere of neutron influence since the sand outside the sphere is not actually measured and hence accuracy of measurement would be influenced by nonuniformity of moisture distribution.

While maximum economy of neutrons is desirable, a far more important factor is the system "delta" or change in slow neutron detector output per change in percent moisture. A large delta means greater possible accuracy while a low delta greatly increases the difficulties of measuring the sand moisture. If tests are made on a number of large sand samples, each of different moisture content, a percent moisture versus detector output calibration curve can be obtained. (See curve $a$–$b$–$c$–$d$, FIGURE 6.) The slope of this curve is the delta to which we are referring and it can be seen that the delta is a variable, increasing as the moisture percentage goes up. Thus based on the considerations thus far presented, the higher the moisture content, the greater the delta and the more accuracy possible. With moisture contents upwards of about 5%, measurement accuracy is easily attained.

However, with low moisture sand, i.e., sand with less than about 5% water, there is a small delta making accuracy difficult. One of the important features of our system is that we have found a reliable convenient manner of overcoming this limitation. This is accomplished by limiting the sample size to less than the sphere of neutron influence thereby allowing the escape of neutrons, as will now be described.

In FIGURE 5 we have indicated an elongated cylindrical container filled with sand. In the center is a source of fast neutrons and a detector of slow neutrons, i.e., the sand moisture gauge probe. Consider now the situation at four different moisture levels. In the wettest sand, the sphere of influence $D_1$ is less than the diameter of the container. This is plotted as point $a$ on FIGURE 6. Somewhat drier sand results in a sphere of influence equal to $D_2$, the diameter of the container. It is plotted as point $b$ in FIGURE 6. With sand of an even lower moisture level, the sphere of influence extends to $D_3$ which extends outside the container. Because many neutrons are lost, the count rate is lower than might be expected. Count rate is plotted as point $x$ on FIGURE 6. Point $c$ in FIGURE 6 is the expected count rate (at the same moisture level) in the case where there is enough sand to fill the sphere of neutron influence. Carrying the illustration one step further, $D_4$ is the sphere of influence with a very dry sand. Point $y$ on FIGURE 6 is the count rate from the system illustrated in FIGURE 5. Point $d$, FIGURE 6, is the expected count rate if enough sand were present to fill the sphere of influence, $D_4$. By comparing curve $a$–$b$–$c$–$d$ with curve $a$–$b$–$x$–$y$, it can be seen that although somewhat wasteful of neutrons, the use of a limited size container results in a far superior calibration curve, there being a large delta even though the moisture content is quite low. In other words, by limiting the size of the sand mass to less than the sphere of neutron influence we allow the escape of neutrons, and the rate of escape varies inversely with the exact moisture content thereby greatly increasing the change in count rate from the slow neutron detector per unit change in moisture content.

Hence, where the percentage hydrogen in the composition being measured is low, we have found it always essential for accuracy that the mass measured occupy less than the sphere of neutron influence so as to allow the escape of neutrons. Further, based on our experimental work we have found that in order to obtain the most accurate moisture measurements on sand containing less than about 5% by weight water the size of the sand mass on which the measurement is taken should be such that the distance from the thermal neutron detector to the outer surface of the sand closest to the detector should not exceed about 16 inches. This about equal to the radius of the sphere of neutron influence for a 5% moisture sand and is increasingly less than the radius of the sphere of neutron influence the drier the sand. If the distance from the detector to the nearest surface of the sand mass is substantially greater than 16 inches, optimum accuracy is sacrificed. The use of a smaller distance does no harm in so far as accuracy is concerned; however, where the distance is too small there is a needless waste of neutrons.

With moisture levels upwards of 5%, the 16 inch limitation is not important from the standpoint of attaining accuracy for the reason that such material inherently affords a large delta. The significant factors in determining an ideally sized mass for high moisture content sand are (1) the mass used should be at least as large as the sphere of neutron influence since there will otherwise be a useless waste of neutrons and (2) the mass should not greatly exceed the sphere of neutron influence for the reason that the probe cannot "see" beyond the sphere of neutron influence and therefore the moisture reading obtained might not be representative of the entire mass used. As will be obvious to those skilled in the foundry art, the consideration of factors relating to moisture percentages above 5% will not generally be applicable to foundry sands since the desired moisture content of foundry sand will always be somewhere in the range of about 1% to 4%.

It will be noted that from the nuclear standpoint the ideal shape for the container 6 would be spherical with the probe being positioned at the center of the sphere. However, practical considerations such as ease of sand handling into and out of the container generally make it desirable that a cylindrical or rectangular shaped container be used. In the embodiment of the invention shown in FIGURE 1, the container 6 is cylindrical; the foundry sand measured with this apparatus has a moisture content in the neighborhood of 3% and the diameter of the cylindrical container, at the center of which is located the measuring probe, is about 30 inches. The weight of such sand mass in this embodiment is 3200 pounds and the weighing scale and associated apparatus shown in the drawings is calibrated to this weight.

In the above, we have described how measurement accuracy can be attained at low moisture levels by limiting the size of the sand mass. Based on the same theory, that of allowing neutron loss in order to accomplish a large delta for the measurement of low moisture content material, we have derived another and for most installations a preferred embodiment of the invention. In this preferred embodiment the size of the container itself is not limited but, instead, the container is constructed so as to include a mass or number of masses of a material, such as cadmium, with a very high thermal neutron absorption cross section, i.e., a very high cross section in comparison to that of the material being measured. The mass or masses of cadmium are shaped and are located within the container so as to shield the thermal neutron detector from a relatively large portion of the sand mass and so as to be at least within the sphere of neutron influence and preferably within 16 inches of the probe. That is, when the sand being measured has a moisture content on the order of about 3% the cadmium mass or masses, preferably in the form of sheets, should be at least within about 19 inches of the probe (the radius of the sphere of neutron influence being about 19 inches) and for optimum results should be located within 16 inches of the probe. Such an embodiment is shown in FIGURES 7 and 8. The steel container 70 is of generally box-shaped construction with a tapered lower bottom wall portion 72 adjacent the gate 73. The location of the measuring probe is indicated at 74. Extending across the container at the center portion thereof and to either side of the probe are a pair of laminated metal walls 76 and 78. Each of these walls consists of a pair of steel sheets 80 and 82 welded to the container and having sandwiched therebetween a cadmium sheet 84. The distance from the probe to the portion of the cadmium sheet nearest the probe is about 10 inches. The cadmium sheets, by way of their absorption of the neutrons thermalized by those portions of the sand mass behind them, create a loss of thermal neutrons sufficient to afford excellent measurement accuracy. Utilizing this embodiment, the only limitation on the size of the container, from the standpoint of measurement accuracy, is that it not be so large as to give rise to inaccuracy by reason of nonuniformity of moisture distribution within the sand mass measured.

*Calibration*

With the device as thus far described, it will be seen that the thermal neutron flux to which the detector tubes 26 and 28 would be exposed while within the shielding drum would be extremely high, this because the large hydrogen content of the paraffin thermalizes the fast neutrons from the source 30.

As means for maintaining the apparatus in accurate calibration, there is positioned between the inner and outer walls of tube 22 a tubular shaped sheet of cadmium foil 48 having a plurality of perforations 49 therein. As mentioned above, cadmium is a shielding for thermal neutrons and hence the only thermal neutrons to which the detector tubes are exposed are those passing through the perforations 49. The number and size of the perforations are such that the thermal neutron flux to which the detector tubes are exposed while in the shielding drum closely approximates the thermal neutron flux to which the tubes would be exposed when within a sand mass having a certain moisture concentration within the range of moisture concentrations expected to be encountered in normal use of the apparatus. This will be seen more clearly from the following description of the procedure used to initially calibrate the apparatus.

A large number of sand moisture measurements are taken with the apparatus, each measurement being on a sand mass having an accurately known moisture concentration within the range of moisture concentrations to be encountered in normal use of the apparatus. For example, where the apparatus is to be ultimately used for the measurement of moisture in foundry sand having a moisture content in the range of from 2% to 4%, foundry sand samples having accurately known moisture concentrations of 2.0%, 2.5%, 3.0%, 3.5% and 4.0% could, for example, be used. The container 6 of the apparatus shown in FIGURE 1 would first be filled with 3200 pounds of the 2% moisture sand and, with the detector tube-neutron source assembly in its measurement-taking position at the bottom of the tube 20, the pointer on timer 62 would sweep through a certain arc across its then unmarked dial. The exact point on the dial at which the pointer stopped would be marked "2.0%." This same procedure would then be repeated with each of the sand samples of different moisture concentrations and the dial would accordingly be marked from 2% to 4%. It will be understood, of course, that numerous sand samples would be used for this calibration procedure and that in actual practice the moisture concentrations of these samples would not likely be spaced by exactly .5%, as in the above examples, which are given merely for purposes of illustration.

After the apparatus has been calibrated in accordance with the above procedure, a few holes are punched in a tube of cadmium foil which is then inserted between the walls of tube 22 as shown. With the detector tube-source assembly in withdrawn position in the shielding drum, the scaler-timer mechanism is actuated and the timer pointer is thereby caused to move through an arc the size of which will, of course, be inversely proportional to the number and size of the perforations in the cadmium foil tube. Ideally, the number and size of the perforations should be such that the pointer stops at about the mid-point on the dial scale, i.e., where the scale is marked for measurements of from 2% to 4% as in the example given above, the perforations should be such that the pointer stops at about 3%. If, on the first trial, the pointer does not stop at about the mid-point of the scale, another trial is made with cadmium foil tube having a different number of perforations. At least within four or five such trials, the perforations in the cadmium tube will be such that the pointer stops within the dial scale and preferably close to the mid-point thereof, and this point is then appropriately marked on the scale to indicate that it is the calibration point. This completes the calibration procedure. At any time it is desired to check the calibration of the apparatus during operation, it is only required to withdraw the detector tube-source assembly into its shielding drum position and actuate the scaler-timer mechanism. If the pointer stops at the calibration point on the scale, there is the assurance that the entire system remains properly calibrated.

*Over-all operation*

Operation of the apparatus shown in FIGURE 1 is as follows: With the safety rod 50 withdrawn, the detector tube-source assembly is lowered through tube 20 to a position in the center of container 6. When 3200 pounds of sand have fed into the container 6, the electric feeder is automatically shut off by way of the connection from scale 64, the same relay starting automatic operation of the scaler-timer mechanism, the pointer on the timer and the counter of the nuclear scaler all automatically being reset to zero. Fast neutrons from source 30 passing into the sand are thermalized by the water present thereby providing a thermal neutron count rate from tubes 26 and 28 which is proportional to the amount of water present. The scaler starts counting and when 100,000 neutrons have been counted a relay in the scaler interrupts the power to the timer motor. The pointer then indicates the moisture content of the sand in the container 6. The operator presses the dump button, sand falls into the muller, the electric feeder starts filling the container 6 again and the cycle repeats. Meanwhile, the operator presses a water feed button long enough to meter out the amount of water indicated on the computer, or, if desired, this can be accomplished automatically by integrating a water feed circuit with the timer reader. Hence, the moisture content of the sand being mixed in the muller is brought up to the desired level. If binding materials are required, they may also be conveniently added during the mixing. After the required amount of mixing, the sand can be dumped onto a conveyer belt and carried to the molding machines for use.

To check the calibration of the gauge the operator merely runs the source-detector tube assembly up into the shielding drum and, by a suitable switch, actuates the scaler-timer mechanism. Proper calibration is indicated by the pointer stopping at the predetermined calibration point marked on the dial of the timer.

It will be understood that while the invention has been described specifically with reference to certain embodiments thereof, various changes and modifications may be made within the full and intended scope of the claims which follow.

We claim:

1. A method for measuring the amount of hydrogenous material in a mass containing both hydrogenous material and nonhydrogenous material, said method comprising irradiating said mass with fast neutrons from a source of fast neutrons inserted into said mass and simultaneously measuring the thermal neutron flux within said mass with a thermal neutron detector inserted into said mass, said mass being limited in size such that it extends in every direction from said detector a distance not substantially exceeding the maximum distance from which neutrons thermalized by the hydrogenous material influence the thermal neutron flux at the detector.

2. A method for measuring the amount of water in a mass of sand containing up to 5% by weight water, said method comprising irridiating said mass with fast neutrons from a source of fast neutrons inserted into said mass and simultaneously measuring the thermal neutron flux within said mass with a thermal neutron detector inserted into said mass, said mass being such that the distance from said detector to the outer surface of said mass closest to said detector is less than the maximum distance from which neutrons thermalized by the water influence the thermal neutron flux at the detector.

3. A method for measuring the amount of water in a mass of sand containing up to 5% by weight water, said method comprising irradiating said mass with fast neutrons from a source of fast neutrons inserted into said mass and simultaneously measuring the thermal neutron flux within said mass with a thermal neutron detector inserted into said mass, said mass being such that the distance from said detector to the outer surface of said mass closest to said detector does not substantially exceed 16 inches.

4. A method for measuring the amount of water in a mass of sand containing up to 5% by weight water, said method comprising the steps of positioning within said mass a body of a material having a high thermal neutron absorption cross section, irradiating said mass with fast neutrons from a source of fast neutrons inserted into said mass and simultaneously measuring the thermal neutron flux within said mass with a thermal neutron detector inserted into said mass to a position spaced from said body a distance less than the maximum distance from which neutrons thermalized by the water influence the thermal neutron flux at the detector.

5. A method for measuring the amount of water in a mass of sand containing up to 5% by weight water, said method comprising the steps of positioning within said mass a body of material having a high thermal neutron absorption cross section, irradiating said mass with fast neutrons from a source of fast neutrons inserted into said mass and simultaneously measuring the thermal neutron flux within said mass with a thermal neutron detector inserted into said mass to a position spaced from said body a distance not substantially exceeding 16 inches.

6. A method for forming a mixture of water and sand such that it contains an exact predetermined amount of water, said method comprising the steps of drying the sand to the extent that it does not contain more water than that desired, irradiating a mass of the sand with fast neutrons from a source of fast neutrons inserted into said mass, simultaneously measuring the thermal neutron flux within said mass with a thermal neutron detector inserted into said mass to thereby obtain a measurement of the amount of water present and then adding water in the amount required to provide the exact predetermined amount desired, the sand mass on which the measurement is taken being such that the distance from said detector to the outer surface of said mass closest to said detector is less than the maximum distance from which neutrons thermalized by the water influence the thermal neutron flux at the detector.

7. A method for forming a mixture of water and sand such that it contains an exact predetermined amount of water, said method comprising the steps of drying the sand to the extent that it does not contain more water than that desired, irradiating a mass of the sand with fast neutrons from a source of fast neutrons inserted into said mass, simultaneously measuring the thermal neutron flux within said mass with a thermal neutron detector inserted into said mass to thereby obtain a measurement of the amount of water present and then adding water to the amount required to provide the exact predetermined amount desired, the sand mass on which the measurement is taken being such that the distance from said detector to the outer surface of said mass closest to said detector does not substantially exceed 16 inches.

8. Apparatus for measuring the amount of hydrogenous material in a composition, said apparatus comprising a container for the composition to be measured, a probe having a fast neutron source positioned adjacent a thermal neutron detector, means for moving said probe to a position adjacent the center of said container, a preset count scaler electrically connected to said thermal neutron detector, said preset count scaler also being electrically connected to a timer to thereby measure the time required for said scaler to receive the preset count from the thermal neutron detector, and means to actuate said scaler to commence the count from the thermal neutron detector when a predetermined amount of the composition to be measured has been added to said container.

9. Apparatus for measuring the amount of hydrogenous material in a composition, said apparatus comprising a container for the composition to be measured, feed means to feed the composition into said container, a probe having a fast neutron source positioned adjacent a thermal neutron detector, means for moving said probe to a position adjacent the center of said container, a preset count scaler electrically connected to said thermal neutron detector, said preset count scaler also being electrically connected to a timer to thereby measure the time required for said scaler to receive the preset count from the thermal neutron detector, and means to deactuate the feed means and to actuate said scaler to commence the count from the thermal neutron detector when a predetermined amount of the composition to be measured has been fed to said container.

10. Apparatus for measuring the amount of hydrogeous material in a composition, said apparatus comprising a container for the composition to be measured, a probe having a fast neutron source positioned adjacent a thermal neutron detector, means for moving said probe to a position adjacent the center of said container and spaced from at least one portion of the walls thereof a distance not substantially exceeding the maximum distance from which neutrons thermalized by the hydrogenous material influence the thermal neutron flux at the detector, a preset count scaler electrically connected to said thermal neutron detector, said preset count scaler also being electrically connected to a timer to thereby measure the time required for said scaler to receive the preset count from the thermal neutron detector, and means to actuate said scaler to commence the count from the thermal neutron detector when a predetermined amount of the composition to be measured has been added to said container.

11. Apparatus for measuring the exact amount of water in sand containing less than about 5% by weight water, said apparatus comprising a container for the sand, a probe having a fast neutron source positioned adjacent a thermal neutron detector, means for moving said probe to a position adjacent the center of said container and spaced from at least one portion of the walls thereof a distance not exceeding about 16 inches, and a count scaler electrically connected to said thermal neutron detector.

12. Apparatus for measuring the exact amount of water in sand containing less than about 5% by weight water, said apparatus comprising a container for the sand, feed means for feeding sand into said container, a probe having a fast neutron source positioned adjacent a thermal neutron detector, means for moving said probe to a position adjacent the center of said container and spaced from at least one portion of the walls thereof a distance not exceeding about 16 inches, a preset count scaler electrically connected to said thermal neutron detector, said preset count scaler also being electrically connected to a timer to thereby measure the time required for said scaler to receive the preset count from the thermal neutron detector, and means to deactuate the feed means and to actuate said scaler to commence the count from the themal neutron detector when a predetermined amount of sand has been fed to said container.

13. Apparatus for measuring the amount of hydrogenous material in a composition, said apparatus comprising a container for the composition to be measured, said container having secured therein a mass of a material having a high thermal neutron absorption cross section, a probe having a fast neutron source positioned adjacent a thermal neutron detector, means for moving said probe to a position adjacent the center of said container and spaced from said mass a distance less than the maximum distance from which neutrons thermalized by the water influence the thermal neutron flux at the detector, and a count scaler electrically connected to said thermal neutron detector.

14. Apparatus for measuring the exact amount of water in sand containing less than about 5% by weight water, said apparatus comprising a container for the composition to be measured, said container having secured therein a sheet of a material with a high thermal neutron absorption cross section, a probe having a fast neutron source positioned adjacent a thermal neutron detector, means for moving said probe to a position adjacent the center of said container and spaced from said mass a distance not exceeding 16 inches, and a count scaler electrically connected to said thermal neutron detector.

15. Apparatus for measuring the exact amount of water in sand containing less than about 5% by weight water, said apparatus comprising a container for the composition to be measured, said container having secured therein at least two masses of cadmium, a probe having a fast neutron source positioned adjacent a thermal neutron detector, means for moving said probe to a position adjacent the center of said container and spaced from each of said masses of cadmium a distance not exceeding 16 inches, a preset count scaler electrically connected to said thermal neutron detector, said preset count scaler also being electrically connected to a timer to thereby measure the time required for said scaler to receive the preset count from the thermal neutron detector, and means to actuate said scaler to commence the count from the thermal neutron detector when a predetermined amount of the composition to be measured has been added to said container.

16. Apparatus for measuring the amount of hydrogenous material in a composition, said apparatus comprising a container for the composition to be measured, a metal tube having a closed lower end extending down into said container and having at the upper end thereof an annular mass of neutron shielding material, a probe having a fast neutron source fixedly positioned adjacent a thermal neutron detector in said tube, means for moving said probe from a shielded position in said annular mass of shielding material to a position in the lower end of said tube adjacent the center of said container, a cylindrical plug of neutron shielding material in said tube fixedly secured to a lower end of and adjacent said probe so as to complete the shielding around said probe when said probe is within said annular mass of shielding material, and a count scaler electrically connected to said thermal neutron detector.

17. Apparatus as set forth in claim 16 wherein said annular mass of neutron shielding material is paraffin and wherein said cylindrical plug is paraffin with a cadmium coating.

18. Apparatus for measuring the amount of hydrogenous material in a composition, said apparatus comprising an elongated metal tube having a closed lower end extending down into said container and having at the upper end thereof a mass of hydrogenous neutron shielding material with a bore therethrough aligned with said tube, a probe having a fast neutron source fixedly positioned adjacent a thermal neutron detector in said tube, means for moving said probe from a shielded position in the bore of said mass of shielding material to a position in the lower end of said tube and calibration means for said probe, said means including a tube of a material with a high thermal neutron absorption cross section in the bore of said mass of hydrogenous shielding material, said tube having at least one opening therein sized to permit the passage of thermal neutrons from the hydrogenous material to said thermal neutron detector at a predetermined rate.

19. Apparatus for measuring the exact amount of water in sand containing less than about 5% by weight water, said apparatus comprising a container for the sand, feed means for feeding the sand into said container, a metal tube having a closed lower end extending down into said container and having at the upper end thereof a mass of paraffin shielding material with a bore therethrough aligned with said tube, a probe having a fast neutron source fixedly positioned adjacent a thermal neutron detector in said tube, means for moving said probe from a shielded position in said mass of paraffin to a position in the lower end of said tube adjacent the center of said container and spaced from at least a portion of the walls thereof a distance not exceeding about 16 inches, a cadmium coated cylindrical plug of paraffin in said tube fixedly secured to a lower end of and adjacent said probe so as to complete the shielding around said probe when said probe is within said mass of paraffin shielding material, a preset count scaler electrically connected to said thermal neutron detector, said preset count scaler also being electrically connected to a timer to thereby measure the time required for said scaler to receive the preset count from the thermal neutron detector, means to deactuate said feed means and to actuate said scaler to commence the count from the thermal neutron detector when a predetermined amount of sand has been fed to said container and calibration means for said probe including a tube of cadmium in the bore of said mass of paraffin, said tube having openings therethrough to permit the passage of thermal neutrons from said mass to the thermal neutron detector so as to provide a predetermined count rate.

20. Apparatus for measuring the exact amount of water in sand containing less than 5% by weight water, said apparatus comprising a container for the sand, said container having secured therein a mass of cadmium, feed means for feeding sand into said container, a metal tube having a closed lower end extending down into said container and having at the upper end thereof a mass of paraffin shielding material with a bore therethrough aligned with said tube, a probe having a fast neutron source fixedly positioned adjacent a thermal neutron detector in said tube, means for moving said probe from a shielded position in said mass of paraffin to a position in the lower end of said tube adjacent the center of said container and spaced from said cadmium mass a distance not exceeding about 16 inches, a cadmium coated cylindrical mass of paraffin in said tube fixedly secured to a lower end of and adjacent said probe so as to complete the shielding around said probe when said probe is within said mass of paraffin shielding material, a preset count scaler electrically connected to said thermal neutron detector, said preset count scaler also being electrically connected to a timer to thereby measure the time required for said scaler to receive the preset count from the thermal neutron detector, means to deactuate said feed means and to actuate said scaler to commence the count from the thermal neutron detector when a predetermined amount of sand has been fed to said container and calibration means for said probe including a tube of cadmium in the bore of said mass of paraffin, said tube having openings therethrough to permit the passage of thermal neutrons from said mass to the thermal neutron detector so as to provide a predetermined count rate.

References Cited by the Examiner

UNITED STATES PATENTS

| | | | |
|---|---|---|---|
| 2,750,144 | 6/56 | Beckwith | 250—83.4 X |
| 2,785,315 | 3/57 | Goodman | 250—83.1 X |
| 2,873,377 | 2/59 | McKay | 250—83.1 X |

RALPH G. NILSON, *Primary Examiner.*

FREDERICK M. STRADER, *Examiner.*